(12) United States Patent
Edwards et al.

(10) Patent No.: US 6,247,005 B1
(45) Date of Patent: *Jun. 12, 2001

(54) EXPERT SYSTEM FOR RESEARCH, DATA COLLECTION AND ANALYSIS

(76) Inventors: John M. H. Edwards, 714 Belgrove Rd., McLean, VA (US) 22101; Noel Hodson, 14 Brookside, Headington, Oxford, OX37PJ (GB); Patrick Mills, 3000 S. Randolph St., Ste 609, Arlington, VA (US) 22206

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/851,317

(22) Filed: May 5, 1997

(51) Int. Cl.[7] ...................................................... G06F 15/00
(52) U.S. Cl. ............................................. 706/47; 706/925
(58) Field of Search ................................. 706/45, 46, 47, 706/51, 925, 926

(56) References Cited

U.S. PATENT DOCUMENTS

| | | | | |
|---|---|---|---|---|
| 4,764,120 | * | 8/1988 | Griffin et al. | 434/336 |
| 5,218,535 | * | 6/1993 | Pietrowski | 364/419 |
| 5,496,175 | * | 3/1996 | Oyama et al. | 434/118 |
| 5,696,702 | * | 12/1997 | Skinner et al. | 364/551.01 |
| 5,704,029 | * | 12/1997 | Wright, Jr. | 395/149 |
| 5,842,195 | * | 11/1998 | Peters et al. | 707/1 |

OTHER PUBLICATIONS

G. Gordon, "Software for managing telecommuting programs is available," Telecommuting Review: the Gordon Report, vol. 12, No. 4, pp. 8–9, Apr. 1995.*
E. Tamrat et al., "Analysis of a telecommuting experience: a case study," Proceedings of the 29th International Conference on Systems Sciences, 1996, vol. 3, pp. 376–385, Jan. 1996.*
G. Gordon, "Survey measures vitural office effects on work, home life," Telecommuting Review: the Gordon Report, vol. 12, No. 4, pp. 12–13, Apr. 1995.*
J. Anderson, "Surveying you telecommuters? Don't Stop with the numbers," Telecommuting Review: the Gordon Report, vol. 13, No. 9, p. 4, Sep. 1996.*

* cited by examiner

Primary Examiner—Mark R. Powell
(74) Attorney, Agent, or Firm—Staas & Halsey LLP

(57) ABSTRACT

An employee enters data relating to the commuting aspects of his or her job, i.e. distance traveled, time traveled, vehicle maintenance, parking, clothing, etc. and this data is collected for analysis. An expert system uses the data to determine the financial costs associated with commuting to work and determines potential savings.

2 Claims, 4 Drawing Sheets

Microfiche Appendix Included
(3 Microfiche, 206 Pages)

EXPERT SYSTEM FOR RESEARCH, DATA COLLECTION AND ANALYSIS

REFERENCE TO MICROFICHE APPENDIX

A microfiche appendix of 3 fiche having 206 frames is included as part of this application for patent.

BACKGROUND OF THE INVENTION

1. Field of the Invention

The present invention is directed to identifying costs and benefits affecting changes in work requirements of many components of an organization and the interaction among these components and, more particularly to determine the potential effect of telecommuting on an organization.

2. Description of the Related Art

As commercial and non-profit organizations and governments consider telecommuting as an option to the pollution, traffic congestion and stress caused by physical commuting, a method of analyzing the complex interaction and effects of such changes is desired. Existing methods, such as TeleworkAudits, merely collect the data, or indicate what should be analyzed. No method of comprehensively analyzing data from numerous individuals is known to exist.

SUMMARY OF THE INVENTION

An object of the present invention is to provide a method and apparatus for analyzing data from numerous individuals taking into account effects on the individuals, organization(s) employing the individuals and others.

Another object of the present invention is to provide a method and apparatus for analyzing data from numerous individuals taking into account environmental and transportation impacts on everyone in an area in which the individuals are employed.

The above objects are attained by providing a method of collecting and analyzing data from numerous individuals by receiving responses from numerous individuals; validating and formatting the responses and to provide response data for analysis; combining the response data from the numerous individuals in a user-defined manner to produce combined data; and analyzing the combined data according to defined rules.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
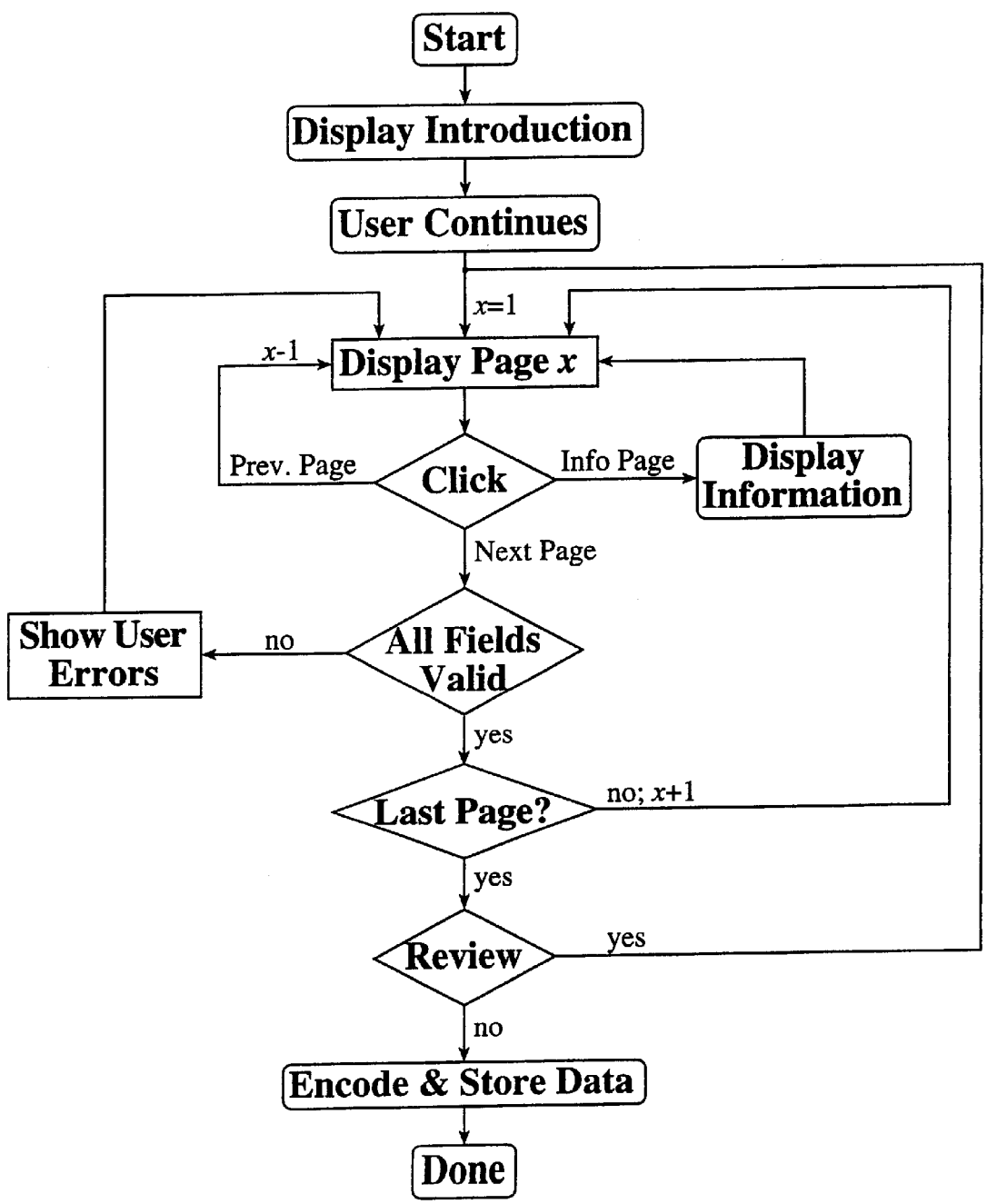
FIG. 1 is a flowchart of data collecting according to the present invention.

As illustrated in FIG. 1, in TeleworkAudits, pages are displayed on a display screen for a user to provide responses. The responses are validated and formatted to produce response data. This process is repeated for numerous individuals. As indicated in the microfiche appendix, in the preferred embodiment, the data relates to current and proposed work and commuting when a change to telecommuting is proposed.

Figure 2:
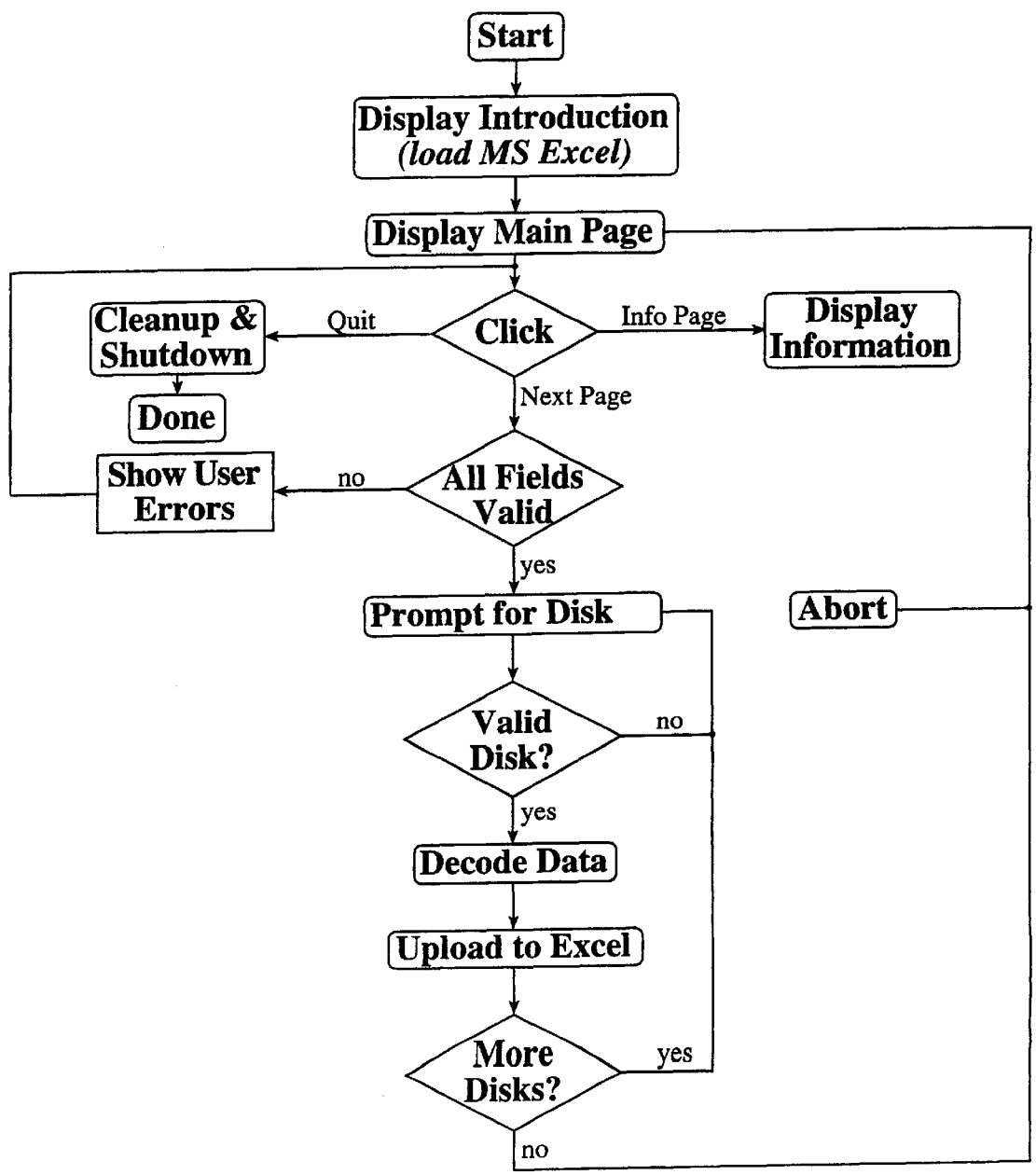
FIG. 2 is a flowchart of for data validation and formatting according to the present invention.

As illustrated in FIG. 2, the response data obtained from TeleworkAudits is organized into a spreadsheet format, such as used by Excel®. As indicated in the microfiche appendix, the response data may be organized by department and several departments to form a company in a user-defined manner. The resulting data will be referred to as combined data.

Figure 3:
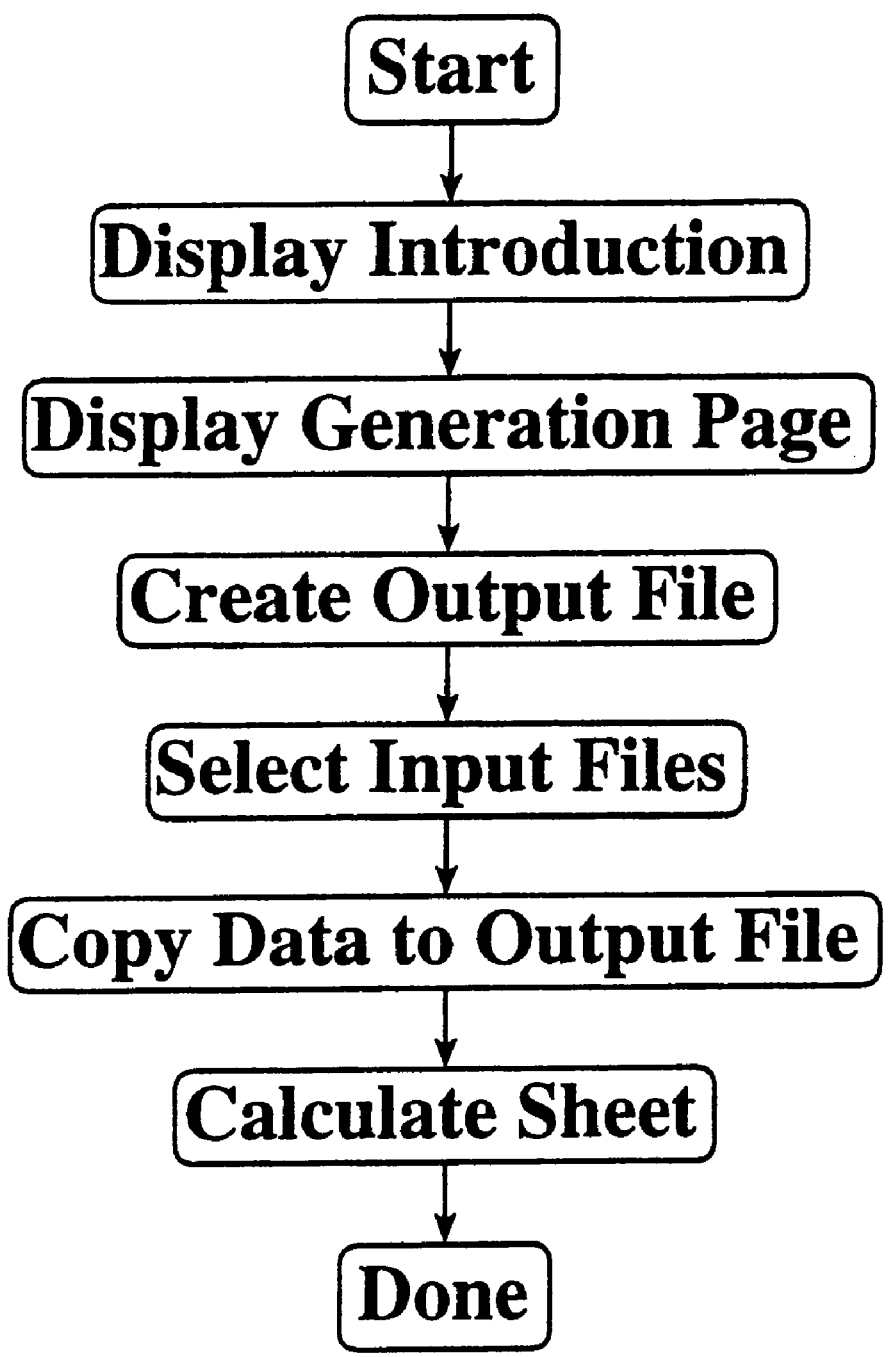
FIG. 3 is a flowchart of data organization according to the present invention.

Prior to organizing the response data, a spreadsheet is created defining how the combined data will be analyzed. The spreadsheet may be modified by the user, as indicated in the microfiche appendix. As illustrated in FIG. 3 and indicated in the microfiche appendix, the combined data is formatted according to the previously defined spreadsheet, so that the analysis is performed by the spreadsheet software.

Figure 4:
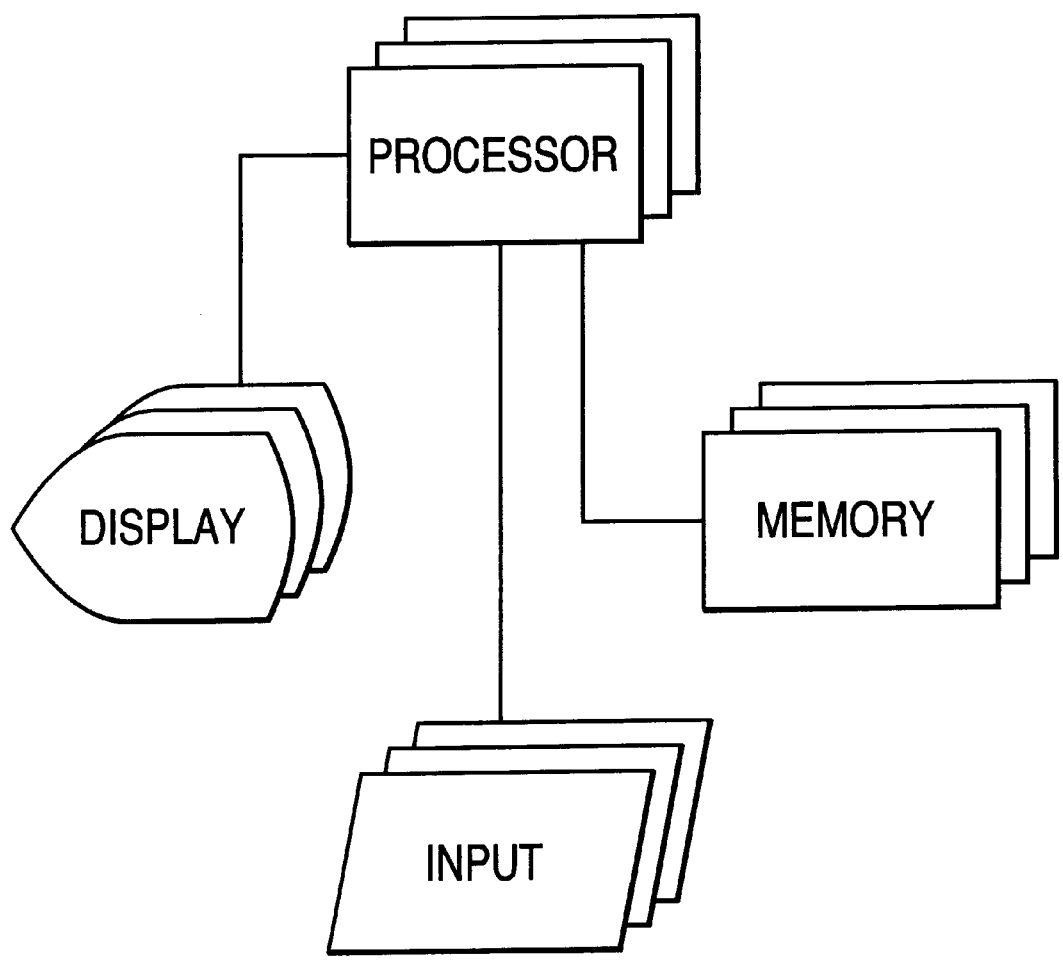
FIG. 4 is a block diagram of a system according to the present invention.

A system on which the method can be implemented is illustrated in FIG. 4. The components illustrated in FIG. 4 may be part of any general purpose computer system or network including a single processor or multiple processors used simultaneously or over a period of time to input response data from numerous individuals and then validate, format, organize and analyze the response data.

The many features and advantages of the present invention are apparent from the detailed specification, and thus it is intended by the appended claims to cover all such features and advantages of the automatic switch which fall within the true spirit and scope of the invention. Further, since numerous modifications and changes will readily occur to those skilled in the art from the disclosure of this invention, it is not desired to limit the invention to the exact construction and operation illustrated and described. Other suitable modifications and equivalents may be resorted to, as falling within the scope and spirit of the invention.

What is claimed is:

1. A method of collecting and analyzing data from a plurality of individuals, comprising:

receiving individual responses to telework options from a plurality of individuals;

validating and formatting the responses to provide response data for analysis of the telework options;

combining the response data from the individuals in a user-defined manner to produce combined data; and analyzing the combined data according to defined rules to determine benefits to at least one organization and society from adoption of at least one of the telework options.

2. A system for collecting and analyzing data from a plurality of individuals, comprising:

at least one display unit to display on a display screen pages requesting responses to telework options from the individuals;

at least one memory, coupled to said at least one display unit storing the pages displayed on the display screen and the responses provided by the individuals; and at least one processor, coupled to said at least one memory, to validate the responses from the individuals, to format the responses from the individuals into data for analysis of the telework options, to organize the data in a user defined manner and to analyze the data according to defined rules to determine benefits to at least one organization and society from adoption of at least one of the telework options.

* * * * *